April 20, 1954  R. T. CATLIN ET AL  2,675,546
SAFETY SHIELD FOR EXPLOSIVELY DRIVEN TOOLS
Filed March 27, 1953  3 Sheets-Sheet 1
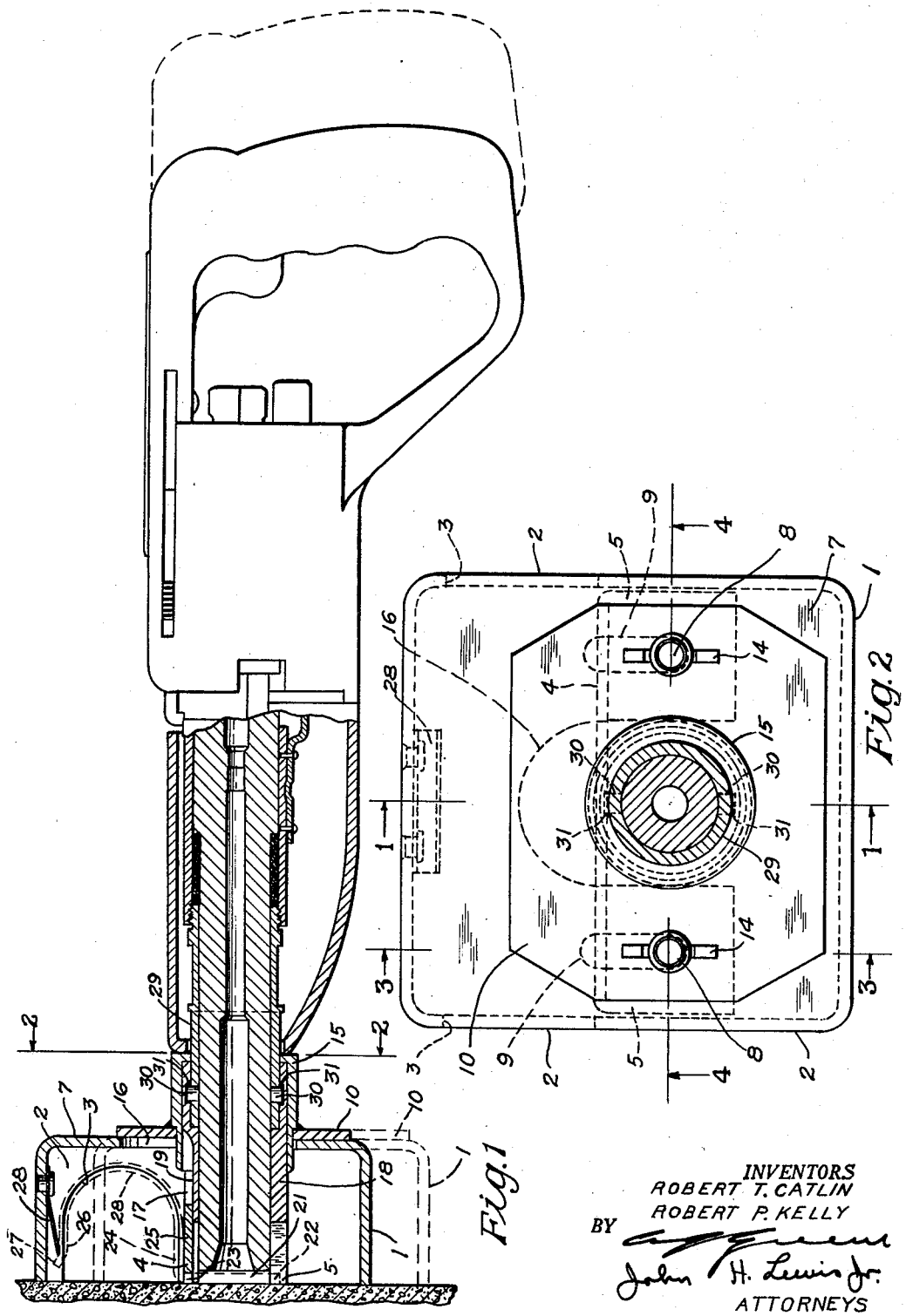
INVENTORS
ROBERT T. CATLIN
ROBERT P. KELLY
BY
ATTORNEYS INVENTORS
ROBERT T. CATLIN
ROBERT P. KELLY
BY
John H. Lewis Jr.
ATTORNEYS April 20, 1954  R. T. CATLIN ET AL  2,675,546
SAFETY SHIELD FOR EXPLOSIVELY DRIVEN TOOLS
Filed March 27, 1953  3 Sheets-Sheet 3

INVENTORS
ROBERT T. CATLIN
ROBERT P. KELLY
BY
ATTORNEYS

UNITED STATES PATENT OFFICE 2,675,546

SAFETY SHIELD FOR EXPLOSIVELY DRIVEN TOOLS

Robert T. Catlin, Stratford, Conn., and Robert P. Kelly, Ilion, N. Y., assignors to Remington Arms Company, Inc., Bridgeport, Conn., a corporation of Delaware Application March 27, 1953, Serial No. 345,211

11 Claims. (Cl. 1—44.5)

This invention relates to a shield or guard for use on an explosively operated stud driver. More particularly, this invention relates to such a shield which is adapted to properly locate the stud driver with respect to a pipe or conduit and simultaneously hold in proper position for penetration by a driven stud a conduit clip for securing the pipe or conduit to a structural member. Although not limited thereto, the new shield is particularly applicable to the stud driver shown in the patent to Merle H. Walker, No. 2,645,772, issued July 21, 1953, using studs and cartridges as shown in the patent to Catlin et al., No. 2,663,259, issued December 22, 1953.

It has long been the practice to secure pipe or conduit to elements of building structure with metal clips having a portion of semi-circular configuration which gripped the pipe and one or more flat basal portions which engaged the face of the element of building structure and were provided with holes for the reception of securing bolts or screws. Such clips have sometimes been secured with a nut on explosively pre-driven studs but that method fails to take full advantage of the time-saving potentialities of the explosively powered stud driver.

To best realize the advantages inherent in an explosively powered stud driver for this purpose, it is unnecessary and, in fact, undesirable to have a pre-formed hole in the basal portion of the clip. The best results and the greatest economy will be realized by positioning the clip over the conduit in its final position and driving a headed stud through the clip and into the building structure—thus simultaneously piercing the clip and fastening it down. While it has been possible to operate in this way with some prior stud drivers, the operator was inadequately protected from material escaping at the point of penetration and, in some cases, special fittings were required for each separate size of conduit and/or separate type of clip. Frequently, it was not possible to accurately and most efficiently position the stud in the clip.

It is the object of this invention to provide a shield for a stud driver which, in conjunction with a standardized clip described herein, will accurately place and hold the conduit clip while the stud is driven through the portion thereof best adapted for secure holding.

It is a further object to provide a conduit clip shield which adequately protects the operator of the stud driver and those working in his vicinity from the hazard of projected particles of scale, concrete spall, or the rare case of a ricocheting stud.

It is a further object to provide a shield which will interchangeably handle without sacrifice in protective efficiency any one of the series of standardized conduit clips described herein.

Additional objects are the provision of a shield which will function to prevent operation of the stud driver unless positioned substantially normal to and in contact with the surface into which the stud is to be driven and one which permits the stud driver to be rotated about its own axis to secure the most convenient working position without disturbing the orientation of the conduit clip.

It is contemplated that these objectives can be best attained by the provision of a shield incorporating a special, adjustable locating fixture arranged for cooperation with each one of the series of standardized conduit clips described herein, which are formed to define certain common locating points. It is contemplated also that those objectives relating to operating safety can be best attained by incorporating in the new shield features discussed in more detail and claimed in the copending application of Robert T. Catlin, Serial No. 252,949, filed October 24, 1951, and entitled "Fire Control for Powder Actuated Tool." The standardized clips described herein are described in more detail and claimed in the copending application of Robert T. Catlin and Robert P. Kelly, Serial No. 345,212, filed March 27, 1953.

The exact nature of the invention as well as other objects and advantages thereof will be more clearly apparent from consideration of the following specification referring to the attached drawings, in which:

Fig. 1 is a vertical cross-sectional view of the new guard assembly in working position, part of the stud driver per se being also shown in vertical sectional view and the remainder in elevation.

Fig. 2 is a horizontal sectional view on the line 2—2 of Fig. 1.

Figs. 5, 6, 7, 8, 9, and 10 are side elevational views of individual ones of a series of conduit clips.

Figure 3:
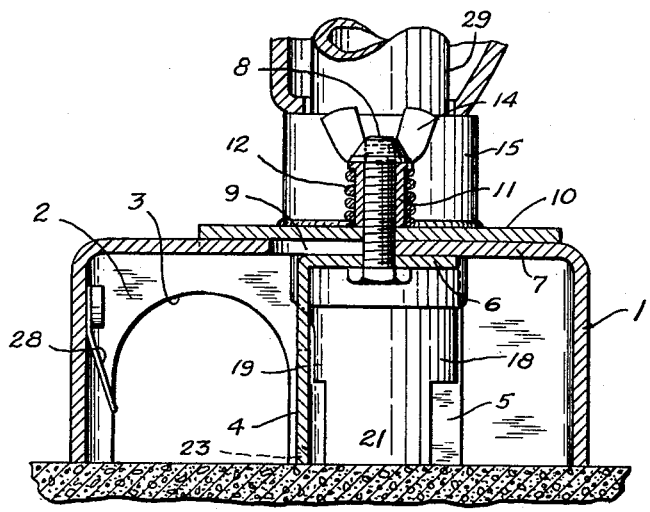
Fig. 3 is a vertical cross-sectional view on the line 3—3 of Fig. 2.
Figure 4:
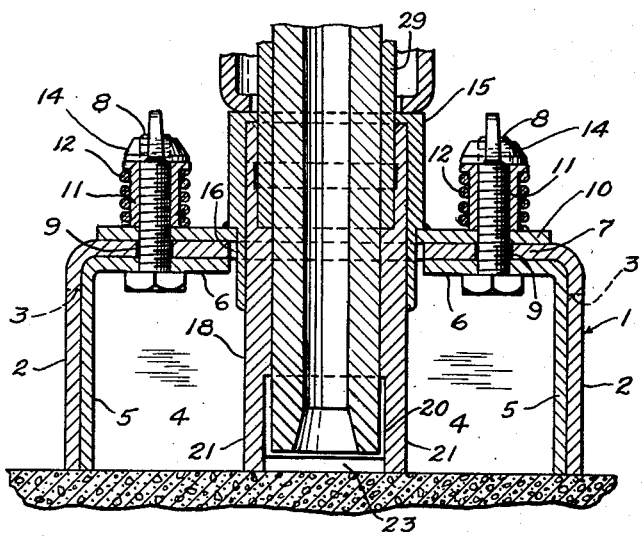
Fig. 4 is a vertical cross-sectional view on the line 4—4 of Fig. 2.
Figures 5, 6:
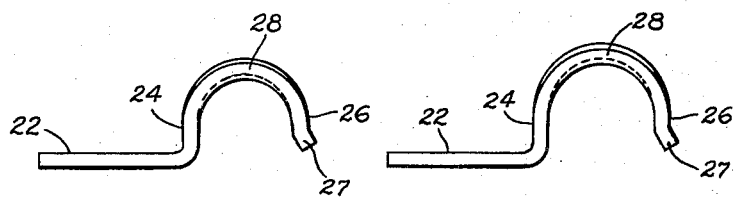
Figures 7, 8:
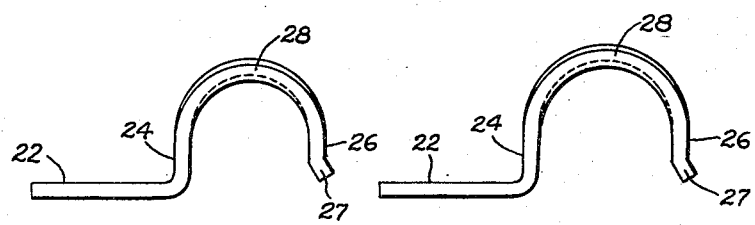
Figures 9, 10:
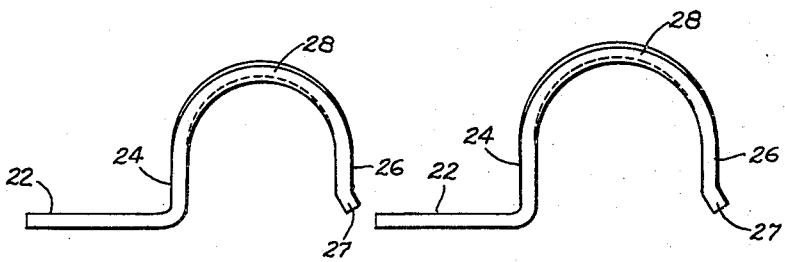
Figure 11:
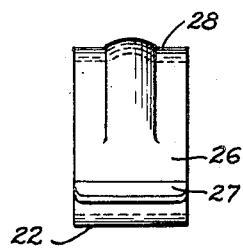

Fig. 11 is an end elevational view of the clip shown in Fig. 10.

Referring to the drawings by characters of reference, it will be seen that the new assembly comprises a shield which is a hollow box-like member 1 having formed in two opposite side walls 2, notches 3 which are adapted to be placed over a conduit or pipe, thus enclosing a section of the pipe within a space defined by the shield on one side and a wall or other element of building structure to which it is desired to secure the conduit.

Within the shield there is a partition or bracket 4 upon which the box-like member 1 is movably supported. The partition 4 is formed with side flanges 5 engaging the side walls 2 of the shield 1 and with top flanges 6 engaging the top wall 7 of the shield 1. This partition divides the shield into a first compartment including the notches 3 through which the conduit may pass, and a second substantially closed compartment.

These top flanges 6 are provided with threaded holes in which there are secured bolts 8 projecting upwardly through slots 9 in the top wall 7 of the shield 1 and which then pass through holes in a plate 10 which overlies the top wall 7. Above the plate 10 each bolt receives a flanged sleeve 11, a coil spring 12 loosely encircling the sleeve and having a free length greater than the sleeve, and a wing nut 14. With this construction it is possible to slack off the wing nut and exert only slight spring pressure, tending to draw the plate 10 and top flanges 6 together upon the top wall 7. Under these conditions the shield 1 may be moved upon the partition to adjustably position the notches 3 relative to the partition, while tightening the wing nuts against the sleeves 11 causes the shield and partition to be securely locked in place. As the shield is moved on the partition, the side flanges 5 automatically maintain the closure of the second compartment at the intersection with the notches 3.

A sleeve 15 is brazed or otherwise permanently secured to the plate 10, passing through that plate and through a slot 16 in the top wall 7 into the interior of the second compartment of the shield 1. A portion of the partition 4 is cut out at 17 to receive a part of the shank of the sleeve which is within the shield.

An action tube extension tip 18 is reciprocably received in the bore of the sleeve 15 but is not rotatable therein because a squared-off face 19 engaged the inside face of the partition 4. A transverse slot 20 cuts through the extension tip, intersecting the lower end thereof to define a pair of legs 21 spaced apart by just enough distance to comfortably receive the basal portion 22 of a conduit clip such as one of those shown in Figs. 5 through 11. A notch 23 in the lower edge of the partion 4 permits the body of the clip to extend from the second compartment, which houses the basal portion of the clip, into the first compartment of the shield where the pipe or conduit passes through the notches 3. Within this portion of the shield the body of the clip is held with one of its straight portions 24 engaged with the outer side 25 of the partition 4 and with the other straight portion 26 of the clip and the hook 27 formed thereon, engaging a leaf spring 28 riveted or otherwise secured to the wall of the shield 1.

A characteristic of each clip designed to be used with this guard is substantial identity in all dimensions of the basal portion 22 and the provision on each clip of a straight portion 24 at right angles to the basal portion adapted to fit against the partition 4 in the same way. Another characteristic is substantial identity in the position of the hook 27 and lower end of the straight portion 26 with reference to a projection of the basal portion 22. Thus, the only significant variable is the inside diameter of the semi-cylindrical portion 28 which determines the height of the tangential straight portions 24 and 26 and is itself determined by the outside diameter of the pipe or conduit to be secured by the clip. With these characteristics of the clip the shield 1 may be moved relative to the partition 4 to accommodate a larger or smaller clip with assurance that each clip will be supported in an identical position with respect to a pipe or conduit, the face of an element of building structure, and the axis of the sleeve 15 and action tube extension tip 18. The sleeve 15, action tube extension tip 18, and action tube extension 29 receive the stud driver barrel and thereby support the stud driver for projecting the stud into the desired location in the basal portion 22 of a clip. It should be noted that as adjusted for each size of clip the hooked portion 27 is closely adjacent the wall of the shield 1, permitting adjacent runs of conduit to be closely spaced.

An action tube extension 29 extends into the extension tip 18 and is there secured with capacity for rotation but not reciprocation relative to the extension tip by radial pins 30 forcibly fitted in radial holes in the action tube extension 29 and engaged within a circumferential groove 31 in the extension tip. The action tube extension 29 is adapted to extend within a housing on the stud driver and there to threadably engage an action tube as more fully shown and described in the pending application of Merle H. Walker, previously referred to, and in the pending application of Robert T. Catlin, also above identified. As shown in both of those applications, the barrel of the stud driver extends through the action tube and action tube extension. It is the function of the action tube to operate a fire control device which unlocks the firing mechanism in the stud driver only when the stud driver is firmly thrust against a work surface and, in the Catlin application above identified, to insure also that the axis of the stud driver is substantially normal to the surface into which a stud is to be driven. It should be noted that the Walker stud driver is, for safety reasons, arranged to be incapable of operation unless a suitable shield and action tube extension are in place.

The details of the fire control or the non-tilt device form no part of the present invention and will not here be described in detail, although it is to be noted that the shield of this invention operates to take full advantage of the safety and non-tilt features of both prior applications.

As in the Catlin application above identified, the firing mechanism can only become operative when the open edge of the shield and the tip of the action tube extension are substantially in a common plane and pressed against a surface into which a stud is to be driven with force enough to compress a spring within the stud driver housing and to force the action tube extension into the housing to a predetermined degree which is the position shown in Fig. 1. Obviously, if the stud driver is applied at an angle to the surface of the work to be penetrated by the stud, the edge of the shield will first encounter the work. Any attempt to apply sufficient pressure to then retract the action tube to release the firing mechanism will only result in urging the exposed end of the sleeve 15 into contact with the stud driver housing and in causing the tip of the action tube extension to project beyond the face of the shield 1. In such a position, the stud driver may not be fired, as fully explained in the aforementioned Catlin application.

In reviewing the operation of the improved shield, it may be noted that a conduit clip of the appropriate size is first engaged between the partition 4 and the spring 28 with the basal portion of the clip extending through the notch 23 into opposition to the stud driver barrel. Obviously, appropriate adjustments of the position of the shield relative to the partition should be made to insure that the clip is securely gripped between the spring and the partition 4.

Upon loading the stud driver with the appropriate assembly of cartridge and stud, the shield may be placed over the conduit and pressed against the element of building structure to which the conduit is to be secured. This action properly positions the clip with reference to the conduit and insures that the basal portion of the clip is in the proper position to be penetrated by the driven stud.

The application of pressure to the stud driver handle then results in advancing the stud driver relative to the building structure and, in effect, in retraction of the action tube extension into the housing of the stud driver where it operates to release the fire control mechanism. Unless the axis of the tool is at substantially a right angle to the surface of the building structure, the action tube extension will not be sufficiently retracted and the firing mechanism may not be operated. The divided leg construction of the action tube extension tip insures that it will be in engagement with the actual face of the building structure which releases the fire control rather than in engagement with the basal portion of the clip, it being noted that such engagement might defeat the purpose of the non-tilt feature if the clip was held in the shield by an exceptionally tight grip of the spring 28.

Upon firing of the stud driver by release of the manual safety and operation of the trigger, the stud will penetrate the basal portion of the clip and secure the clip and conduit embraced thereby to the buidling structure.

During the firing period, the basal portion of the clip and the area of the building structure in which penetration takes place is completely surrounded by the boxlike shield, and the partition extending across the interior of the shield prevents the escape of any flying particles through the notches cut in the side walks of the shield to permit it to fit over the pipe. The volumn of the shield can readily be made adequate to permit expansion and cooling of the muzzle blast with negligible lifting of the shield, that condition being reached with a shield of less than the 4" x 4" x 1¾" dimensions of the preferred embodiment. With the shield made of a good grade of heat-treated steel, there is no danger that a ricochetting stud can escape to cause injury. Small particles of spalled concrete, of scale or paint from steel surfaces, powder residue, and stud heel cap fragments, are retained within the shield on firing.

While only one embodiment has been shown and specifically described in its application to the stud driver shown in pending applications referred to herein, it should be noted that the invention is applicable to other stud drivers and that modifications may be made without departing from the spirit of the invention. For an exact definition of the limits of the invention, reference may be had to the claims appended hereto.

We claim:

1. A shield for an explosive powered stud driver to facilitate use with conduit clips, which clips have a generally semi-cylindrical conduit engaging body portion and a flat basal portion extending therefrom, said shield comprising a hollow member of penetration resistant material having an open side to be placed against an element of building structure against which the basal portion of the clip is to be secured by a driven stud; a partition member of penetration resistant material supported in said hollow member to divide same into a first compartment through which the conduit may pass and a second compartment; cooperating holding means in said first compartment adapted to receive and support a conduit clip body portion with the basal portion of said clip extending beneath the partition member into the second compartment; and tubular means mounted on said hollow member to telescopically receive the barrel of a stud driver and to thereby support a stud driver for driving a stud into said second compartment in position for penetration through the basal portion of a conduit clip engaged by said holding means, the axis of said tubular means being substantially normal to the basal portion of said clip extending into said second compartment and intersecting said basal portion near the center of the flat area thereof.

2. A shield as described in claim 1, said cooperating holding means comprising opposed surfaces on said partition and on the inner surface of the first compartment of said hollow member, said opposed surfaces being adapted to receive between them and to releasably retain the semi-cylindrical portion of a conduit clip.

3. A shield as described in claim 2, said partition member and said tubular stud driver supporting means being fixed in relation to each other, said hollow member being supported relative to said partition by means which permit lateral movement of the boxlike member to adjust the spacing between said opposed surfaces.

4. A shield as described in claim 3, the one of said opposed surfaces on said hollow member comprising a leaf spring member adapted to resiliently engage said conduit clip.

5. A shield as described in claim 4, said partition member being provided with a notch in its lower edge substantially complemental to the basal portion of said clip whereby said basal portion of the clip may pass beneath said partition member without holding said partition member away from the surface to which the clip is to be secured.

6. A shield as described in claim 5, said tubular stud driver supporting means being attachable to the stud driver in telescopic relation to the barrel thereof to maintain axial alignment of the line of projection of the stud by the stud driver with the position of the basal portion of conduit clip secured in the shield, the attachment of said tubular means to the stud driver providing freedom for rotation of the stud driver about the axis of alignment to secure a convenient firing position.

7. A shield as described in claim 6, said tubular stud driver supporting means including an action tube extension attachable to the stud driver; and an action tube extension tip coaxial with said extension and non-rotatably secured to said shield, said action tube extension and the said action tube extension tip being joined by a connection preventing relative reciprocation between the action tube extension and the action tube extension tip but permitting their free relative rotation about their common axis.

8. A shield as described in claim 7, said extension and the tip therefor being fitted one within the other, the outermost being provided with a circumferential groove in its inner surface and the innermost being provided with outwardly extending radial pins received in said circumferential groove.

9. A shield as described in claim 8, said action tube extension tip being formed to define legs spaced apart by a distance greater than the width of the basal portion of a conduit clip extending into said second compartment, said legs being oriented to straddle the basal portion of a clip so extending for contact with the surface to which the clip is to be secured.

10. A shield for an explosive powered stud driver to facilitate use with a series of sizes of conduit clips, which clips have a generally semi-cylindrical conduit engaging body portion and each of which has a substantially identical flat basal portion extending therefrom for engagement with a surface to which the conduit is to be secured, said shield comprising a hollow boxlike member of penetration-resistant material having an open side adapted to be placed in contact with the surface to which the basal portion of a clip is to be secured by a driven stud; a partition member of penetration-resistant material in said boxlike member to divide same into a first compartment and a second compartment, the side walls of the portion of said boxlike member defining said first compartment being apertured to permit a conduit to pass therethrough parallel to said partition; cooperating holding means in said first compartment, said holding means being defined by said partition and by a member secured to the side wall of said boxlike member opposed thereto, said holding means being adapted to receive between them and to releasably support the body portion of a conduit clip in position to embrace a conduit passing through said apertured walls and with the basal portion of said clip extending beneath said partition into said second compartment; and tubular means positionally fixed with relation to said partition to telescopically receive the barrel of the stud driver and to support a stud driver with the line of projection of the stud extending into said second compartment and intersecting the position occupied by the basal portion of a clip having its body portion engaged in said cooperating holding means, said boxlike member being supported relative to said partition by means which permit lateral movement of the boxlike member to adjust the width of said first compartment and the space between said cooperating holding means to releasably support any desired one of a series of sizes of conduit clips.

11. A shield as described in claim 10, said partition member being formed with a top flange engaging the inside of the top of said boxlike member; said stud driver supporting means including a plate on the outside of the top of said boxlike member, the top of said boxlike member being formed to define holes elongated along a line normal to the partition; said means positionally fixing the stud driver supporting means relative to said partition including releasable clamping members extending through said elongated holes and joining said top flange and said plate.

References Cited in the file of this patent
UNITED STATES PATENTS

| Number | Name | Date |
|---|---|---|
| 2,549,993 | Temple | Apr. 24, 1951 |
| 2,594,275 | Baisch | Apr. 29, 1952 |
| 2,637,241 | Weber | May 5, 1953 |